United States Patent

[11] 3,617,784

[72] Inventor Nils Kauri Lindgren
 Stockholm, Sweden
[21] Appl. No. 96,472
[22] Filed Dec. 9, 1970
[45] Patented Nov. 2, 1971
[73] Assignee Aktiebolaget Electrolux
 Stockholm, Sweden
[32] Priority Dec. 12, 1969
[33] Sweden
[31] 17168/69

[54] STRUCTURE FOR MOUNTING ELECTRIC MOTORS
 6 Claims, 2 Drawing Figs.
[52] U.S. Cl. .................................................. 310/91,
 310/87, 248/19
[51] Int. Cl. .................................................. H02k 5/00
[50] Field of Search .......................... 310/91, 87;
 248/19

[56] References Cited
 UNITED STATES PATENTS
3,143,284 8/1964 Lindsjo ................. 310/91 X Primary Examiner—D. X. Sliney
Attorney—Edmund A. Fenander ABSTRACT: An electric motor having a stationary part formed with an annular groove is mounted on a member at an aperture therein. The member at the aperture has an inner edge which includes an inward extending portion between a pair of elastomeric O-rings disposed in the bottom of the groove. The inner edge of the apertured member functions to hold the O-rings in frictional engagement with the motor part. Each of the O-rings in such frictional engagement with the motor part presses against the other with each of the O-rings bearing against a different one of the axially spaced shoulders of the groove in sealing engagement therewith.

PATENTED NOV 2 1971 3,617,784

STRUCTURE FOR MOUNTING ELECTRIC MOTORS

BACKGROUND OF THE INVENTION

1. Field of the Invention

Electric motors often are mounted by structure in such manner that the electric motors are in sealing relation with the mounting structure.

2. Description of the Prior Art

It has been the practice heretofore to provide a pair of flanges on a part of an electric motor between which an inner edge portion of an apertured plate or member, which serves as a part of the mounting structure, is positioned. The flanges are mechanically pressed together in order to anchor the electric motor on the plate or member in sealing relation therewith. This is objectionable because anchoring an electric motor on the plate or member in this manner is costly, the assembly of the different components requiring considerable time before they can be fixed to one another by suitable fastening means like threaded bolts and tightening nuts, for example.

SUMMARY OF THE INVENTION

It is an object of my invention to provide an improved structure for quickly mounting electric motors and removing them from the mounting structure at will without the use of tools. I accomplish this by providing an annular groove in a stationary part of an electric motor and an apertured member which can form a wall of a vessel and serves as a component of the mounting structure and coacts with the annular groove.

The member at the aperture therein has an edge portion which includes an inward extending portion between a pair of elastomeric O-rings disposed in the bottom of the groove, the inner edge of the apertured member functioning to hold the O-rings in frictional engagement with the motor part. Each of the O-rings in such frictional engagement with the motor part presses against the other with each of the O-rings bearing against a different one of the axially spaced shoulders of the groove in sealing engagement therewith.

DESCRIPTION OF THE PREFERRED EMBODIMENT

Figure 1:
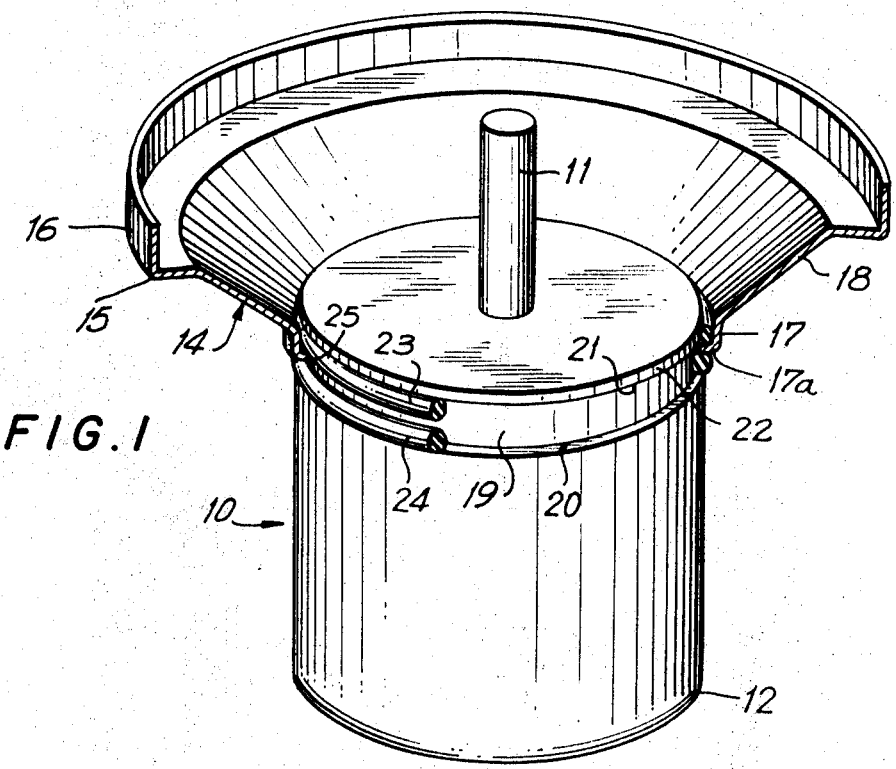
FIG. 1 is a perspective view, partly broken away and in section, of an electric motor mounted by structure embodying my invention.

Referring to the drawing, I have shown my invention as applied to an electric motor 10 comprising a rotatable member (not shown) including a shaft 11 and a stationary part comprising a casing or housing 12 within which the rotatable member is disposed.

Figure 2:
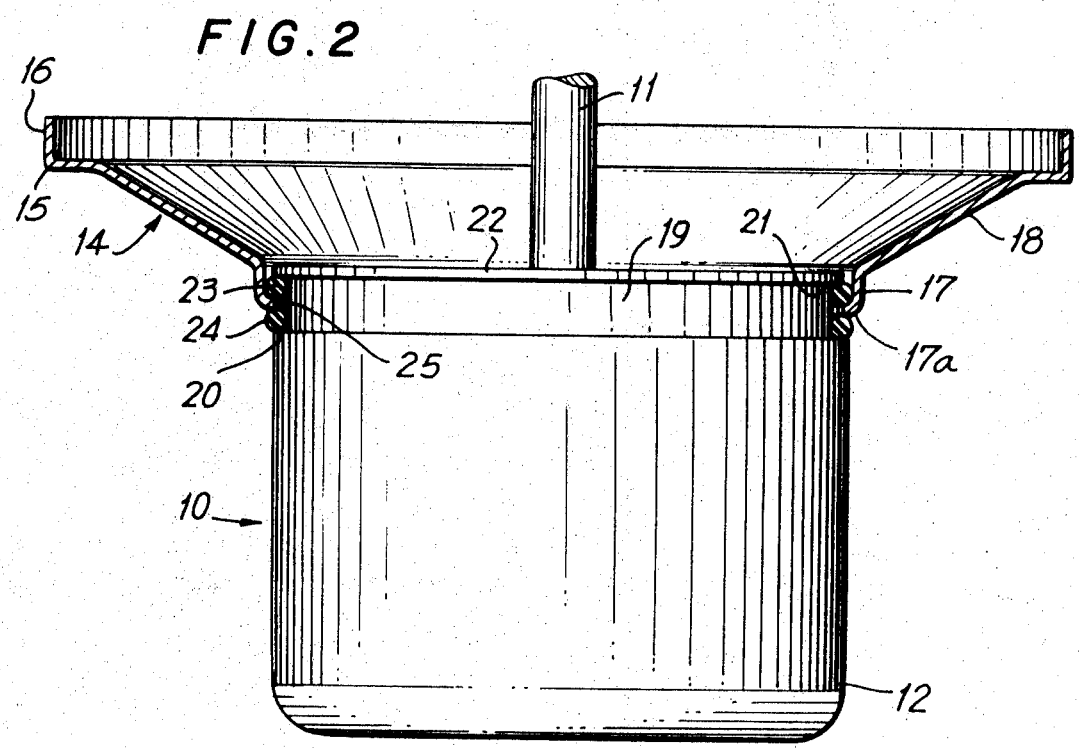
FIG. 2 is an elevational view, partly in vertical section, of the electric motor and mounting structure therefor shown in FIG. 1.

The motor 10 is mounted in an apertured member or part 14 of a vessel or container 15 which serves as a component of the motor mounting structure. The vessel 15 includes an outer rim or side 16 and an inner flange 17, both of which are essentially parallel to the axis of the shaft 11, and a wall 18 therebetween which is of conical form and inclined to axis of the motor shaft. In FIG. 1 and 2 it will be seen that the inclined wall 18 and inner flange 17 define the apertured part or member 14 of the vessel 15.

In accordance with my invention the structure for mounting the electric motor 10 on the apertured member 14 of the vessel 15 includes an external annular groove 19 which is disposed about the housing 12 and extends lengthwise of the vertical axis of the motor. The groove 19 is formed at the narrow end of the housing 12 from which the shaft 11 projects and is defined by a first shoulder 20 and a second shoulder 21 which is axially spaced therefrom and formed by a flange 22 at the shaft end of the housing 12.

A pair of element 23 and 24 of annular form are disposed in the bottom of the groove 19. O-rings can be employed as the elements 23 and 24. The O-rings are formed of elastomeric material like natural or synthetic rubber or plastic, for example.

The inner flange 17 of the member 15 includes an inturned edge portion 17a whose inner extremity defines the aperture 25 in the member or part 14. The inturned edge portion 17 a of the flange 17 extends inward between the elements or O-rings 23 and 24. Hence, the inner edge or flange 17, including the inturned portion 17a thereof, functions to hold the O-rings 23 and 24 in frictional engagement with the housing 12 of the motor 10.

Each of the elements or O-rings 23 and 24 presses against the other when in frictional engagement with the motor housing, each of the elements 23 and 24 bearing against a different one of the shoulders 20 and 21 in sealing engagement therewith. As shown most clearly in FIG. 2, the top O-ring 23 is held in a seat formed by the inner flange 17 and its inturned edge portion 17a and bears against the shoulder 21 in sealing relation therewith. Hence, the top O-ring 23 is in good physical contact with the flange 22 and disposed within the vessel or member 15.

The bottom O-ring 24, on the other hand, bears against the shoulder 20 in sealing relation therewith and is disposed outside the vessel or member 15 below the inturned edge portion 17a of the inner flange 17.

The axial length of the groove 19 between the spaced shoulders 20 and 21 is substantially the combined diameters of the O-rings 23 and 24. The O-rings 23 and 24 desirably are identical in which case the axial length of the groove 19 is about twice the diameter of a single O-ring. With identical O-rings 23 and 24 the depth of the groove 19 is slightly less than the radius of a single O-ring. The aperture 25 in the member or part 14 is slightly larger than the diameter of the motor casing or housing 12 so that some play is obtained when the motor 10 is inserted into the vessel or container 15.

To mount the motor 10 on the vessel 15 the bottom O-ring 24 is positioned on the motor housing 12 at a region thereof below the bottom shoulder 20 of the groove 19. The motor 10 is then moved downward through the aperture 25 in the member or part 14 to located the motor shaft 11 within the vessel 15 and position the flange 22 at such a distance from the seat formed by the inner flange 17 and its inturned edge portion 17a that the top O-ring 23 can be placed in the groove 19. With the top O-ring 23 positioned in the groove 19 and the motor is moved downward so that the O-ring 23 will bear against the shoulder 21 at the underside of the flange 22. At this time the bottom O-ring 24 can be pushed upward on the motor housing 12 to position it in the groove 19 in sealing relation to the bottom shoulder 20.

To remove the motor 10 from the vessel 15 the bottom O-ring 24 is lifted from the groove 19 and moved downward on the housing 12 to a region below the bottom shoulder 20. The motor 10 is then moved downward a short distance through the aperture or opening 25 to permit removal of the top O-ring 23 from the groove 19. When this has been done the motor 10 can be freely moved upward through the opening 25 in the wall or member 14 of the vessel 15.

In view of the foregoing, it will now be understood that I have provided improved structure for mounting the motor 10 on the vessel 15 and removing the motor from the vessel at will without the use of tools.

I claim:

1. In combination,
   a. an electric motor and mounting structure therefor comprising an apertured member,
   b. said motor having a stationary part which is disposed about the axis of said motor and is formed with axially spaced shoulders defining an external annular groove which extends lengthwise of the motor axis,
   c. a pair of elements of annular form which are disposed in the bottom of said groove,
   d. said member at the aperture therein having an inner edge which includes an inward extending portion between said elements, said inner edge functioning to hold the said elements in frictional engagement with said motor part, and e. each of said elements in such frictional engagement with said motor part pressing against the other with each of said elements bearing against a different one of said shoulders in sealing engagement therewith.

2. The combination set forth in claim 1 in which said elements comprise O-rings formed of elastomeric material like rubber, for example, the axial length of said groove being substantially the combined diameters of said O-rings 3. The combination set forth in claim 2 in which the diameters of said O-rings are substantially the same.

4. The combination set forth in claim 3 in which the depth of said groove is less than the radii of said O-rings 5. In combination,
 a. an electric motor and mounting structure therefor comprising a vessel including an apertured wall,
 b. said motor having a stationary part which is disposed about the axis of said motor and is formed with axially spaced shoulders defining an external annular groove which extends lengthwise of the motor axis,
 c. a pair of elements of annular form which are disposed in the bottom of said groove,
 d. said wall at the aperture therein having an inner edge which includes an inward extending portion between said elements, said inner edge functioning to hold said elements in frictional engagement with said motor part, and
 e. each of said elements in such frictional engagement with said motor part pressing against the other with one of said elements disposed within said vessel and bearing against one of said shoulders in sealing relation therewith and the other of said elements disposed exteriorly of said vessel and bearing against the other of said shoulders in sealing relation therewith.

6. The combination set forth in claim 5 in which said elements comprise a pair of substantially identical O-rings formed of elastomeric material like rubber, for example, the axial length of said groove being substantially twice the diameter of said O-rings and the depth thereof being slightly less than the radii of said O-rings.

* * * * *